United States Patent
Chan et al.

(10) Patent No.: US 6,826,177 B1
(45) Date of Patent: Nov. 30, 2004

(54) PACKET TELEPHONY APPLIANCE (75) Inventors: Mike Chan, Dix Hills, NY (US); Charles D. Cranor, Morristown, NJ (US); Raman Gopalakrishnan, Succasunna, NJ (US); Peter Z. Onufryk, Flanders, NJ (US); Laurence W. Ruedisueli, Berkeley Heights, NJ (US); Cormac John Sreenan, Morristown, NJ (US)

(73) Assignee: AT&T Corp., New York, NY (US)

( * ) Notice: Subject to any disclaimer, the term of this patent is extended or adjusted under 35 U.S.C. 154(b) by 430 days.

(21) Appl. No.: 09/594,288

(22) Filed: Jun. 15, 2000

Related U.S. Application Data (60) Provisional application No. 60/139,355, filed on Jun. 15, 1999.

(51) Int. Cl.[7] .............................................. H04L 12/66
(52) U.S. Cl. ...................................... 370/352; 370/463
(58) Field of Search ................................ 370/352, 353, 370/354, 355, 356, 395.1, 395.52, 395.7, 395.71, 395.72, 401, 428, 429, 463, 466

(56) References Cited

U.S. PATENT DOCUMENTS 5,726,984 A * 3/1998 Kubler et al. ............... 370/349
6,173,333 B1 * 1/2001 Jolitz et al. .................. 709/240
6,343,086 B1 * 1/2002 Katz et al. ................... 370/489
6,426,943 B1 * 7/2002 Spinney et al. ............. 370/235
6,580,727 B1 * 6/2003 Yim et al. ................... 370/463

* cited by examiner

Primary Examiner—Kwang Bin Yao (57) ABSTRACT

A packet telephony appliance includes a Euphony network processor that integrates networking and DSP functions to provide a low cost and efficient solution in building a networked appliance. In particular, a Euphony ATM Telephone (EAT) is built around the Euphony network processor. The EAT uses a real-time operating system to provide predictable processing and networking support. The EAT implements IObufs, which provides a unified buffering scheme that allows zero-copy data movement. Furthermore, the EAT uses an Event Exchange (EVX), which provides a flexible mechanism for event distribution, allowing software modules to be composed together in an extensible manner. EVX and IObufs are used together to provide highly efficient intra-appliance communication. The EAT provides a platform that can evolve gracefully to support new protocols, advanced telephony services and enhanced user interfaces.

21 Claims, 3 Drawing Sheets

FIG. 3

PACKET TELEPHONY APPLIANCE

PRIORITY CLAIM

The present application claims priority from a U.S. Provisional Application Ser. No. 60/139,355, entitled "Hardware and Software Architecture of a Packet Telephony Appliance" which was filed on Jun. 15, 1999, and which is hereby incorporated by reference in its entirety.

FIELD OF THE INVENTION

The present invention generally relates to a packet telephony appliance.

BACKGROUND INFORMATION

Potential efficiencies in using data networks for intra-company telecommunications are generally recognized. Many companies have interconnected their office PBXs using corporate intranets. Given that many office environments are equipped with high-speed LANs, an opportunity exists for additional efficiencies to be achieved by extending packet telephony to the desktop, thus eliminating the need for maintaining two separate office networks. With greater penetration of high-speed residential access and new technologies for in-home networking, similar opportunities exist for packet telephony in the home.

Conventional devices suffer from a number of disadvantages. Some devices are unable to process multimedia data and/or implement new user interfaces. Other conventional devices suffer from difficulties related to software/hardware installation and configuration, low voice quality due to operating system latencies and scheduling idiosyncrasies, and exorbitant expense in comparison to other consumer appliances. Still other conventional devices are relatively large, generate vast amounts of noise and heat, and may be difficult to use by non-technical personnel.

Despite a wealth of experience with packet voice, the field of packet telephony is still in its relative infancy and lacking in standards. Thus, as can be seen, there is a need for a packet telephony appliance that is relatively low in cost with respect to other consumer appliances, that has a wide range of extensibility, that is easy to use so that ordinary people that have no special technical training and that are probably unwilling to invest substantial resources in setting up and configuring new appliances can operate it, and that provides a high level of reliability even in possibly hostile physical environments.

SUMMARY OF THE INVENTION

Accordingly, the present invention is directed to a packet telephony appliance having a network processor that integrates networking and DSP functions, and has a serial input port, a serial output port and a network interface; has an output device coupled to the serial output port; has an input device coupled to the serial input port; and has a network coupled to the network interface, wherein the packet telephony appliance implements a unified buffering mechanism that provides zero-copy data movement, and wherein the packet telephony appliance implements an event-based mechanism for intra-appliance communication. The present invention is further directed to a method of providing system software services in a packet telephony appliance in which there is loading and executing a real-time single address space operating system kernel; implementing a uniform buffering mechanism across all modules in the packet telephony appliance, the uniform buffering mechanism being a zero-copy mechanism for storing and passing data; and implementing an event-based mechanism for communicating between the modules.

DETAILED DESCRIPTION

Although the present invention is generally applicable to a wide variety of packet telephony environments including, for example, the underlying networking technology, signaling and directory services employed, the following embodiments according to the present invention contemplate a packet telephony environment based on the telephony over packet networks (TOPS). A discussion of TOPS is adequately addressed in N. Anerousis et al., "TOPS: An Architecture for Telephony Over Packet Networks," IEEE Journal on Selected Areas in Communications (JSAC), 17(1):91–108 (January 1999) and is incorporated here by reference in its entirety. The present invention further contemplates that the functional components of the packet telephony appliance are substantially independent of the underlying networking technology, signaling and directory services employed. Moreover, the present invention contemplates a design that can easily evolve to support new standards.

A guiding principle of TOPS is to make it more convenient to reach a user. A packet telephony service employs a directory service function that can translate between telephone numbers and network layer address such as, for example, IP or ATM addresses. TOPS allows callers to reach a person, for example, using a distinguishing name (DN) rather than an address by storing information in the directory service about DNs and the set of devices where users can be reached. A DN is a unique identifier for the person or entity to be called and may be an X.500 DN, an e-mail address or a traditional telephone number, for example. Callers may obtain terminal addresses of users by issuing a name resolution query to the directory service. As users move between terminals, users may securely modify their record entries to reflect the locations where they can be reached. Thus, user mobility is supported as a fundamental capability of TOPS.

The directory service provides a mechanism for individual users to control how a name resolution query is handled, for example, based on time of day and/or caller identity. Thus, users may customize access to their information. Such an approach is flexible while also giving the user substantial control. TOPS terminals range from computers running telephony applications to low-cost packet telephony appliances. Examples of terminals include a packet telephony appliance, a PC-equipped with a sound card running a telephony application, a PC acting as a proxy for a set of analog telephones and/or a voice-enable wireless PDA. Terminal capabilities are stored in the directory and may be returned to the caller as part of the name resolution so that appropriate communication resources can be setup.

Functions provided by tradition telephone networks such as routing, connectivity and resource management are supported by packet networks. These functions coupled with intelligent end-systems reduce the need for intermediate network entities to be involved in packet telephone calls. Packet telephones in the TOPS architecture, for example, communicate directly with each other using application-layer signaling (ALS). ALS is used to setup a call, negotiate capabilities, establish and manage media channels and terminate calls. TOPS defines an efficient encapsulation format for audio data, but does not preclude the use of other formats.

In addition to the TOPS architecture, some embodiments according to the present invention contemplate using ATM, for example, as the underlying networking technology. ATM ensures good quality voice transport, for example. Furthermore, voice is carried over switched virtual circuits which are established at call time. Other data such as call signaling and directory interactions do no have strict delay requirements and may be implemented using IP, for example, over ATM. A gateway may be provided including a bridge to a PBX.

Furthermore, the present invention contemplates operating in an "always on" power state. The packet telephony appliance includes a central processing unit (CPU) that does not require cooling. In addition, the present invention includes solid state Flash memory rather than a hard drive and does not include an integrated display. With respect to software of the packet telephony appliance, the reliance on external systems by the packet telephony appliance is minimized when providing a highly reliable, basic telephone service.

The present invention contemplates a comprehensive hardware and software architecture that includes a low-cost integrated network processor, a lightweight call signaling implementation, a modular and extensible telephony application design and an event exchange mechanism for flexible inter-module communication.

Figure 1:
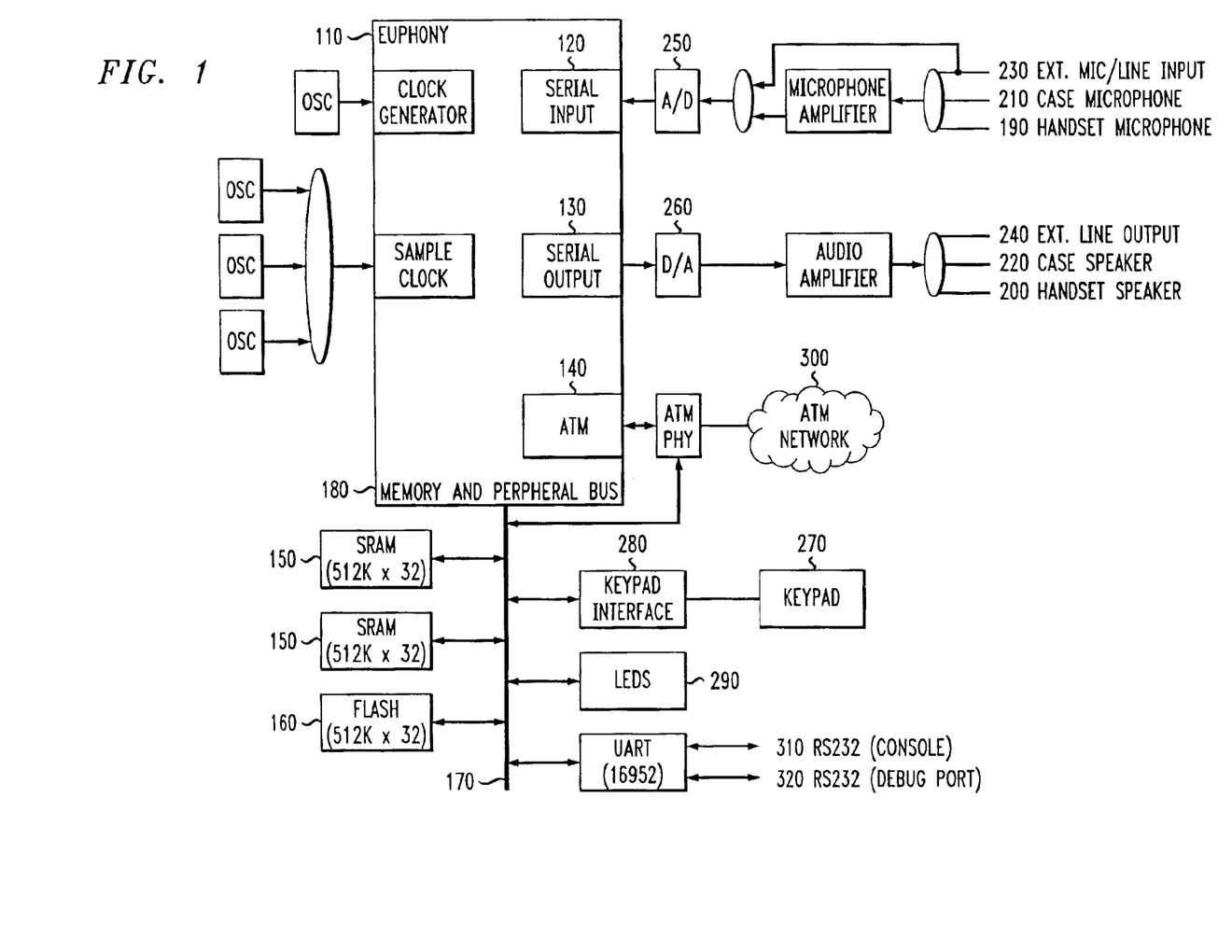
FIG. 1 illustrates a block diagram of an embodiment of a packet telephony appliance according to the present invention.

FIG. 1 illustrates a block diagram of an embodiment of a packet telephony appliance according to the present invention. In the illustrated embodiment, the packet telephony appliance is a Euphony ATM telephone (EAT) 100, for example.

A central component of the EAT is Euphony 110, a network processor which integrates computing, media processing and networking into a single low-cost VLSI device. Euphony is described in P. Z. Onufryk, "Euphony: A Signal Processor for ATM," EE Times, pages 54–80 (Jan. 20, 1997) and P. Z. Onufryk, "Euphony: An Embedded RISC Processor for Low Cost ATM Networking and Signal Processing," Design SuperCon97: Digital Communications Design COnference, pages C112-1 to C112-16 (1997) which are both incorporated here by reference in their entirety. Euphony 110 may be implemented using LSI Logic's LCB500K 0.5 micron drawn cell-based ASIC process. Euphony 110 integrates many of the functions required to build network appliances on-chip, thereby reducing cost, power and size.

Euphony 110 is based on a MIPS RISC processor core, for example, that is augmented with a single cycle pipelined multiplier and signal processing instructions. Most of the system logic used in building a complete system is contained within Euphony 110, including the logic required to interface to standard SRAMs, DRAMs, VRAMs and many other peripherals. Power-on reset generation and a five channel DMA controller are provided on-chip. In addition, Euphony 110 provides general purpose I/O pins which may be configured as bit I/O ports or as interrupts.

Euphony 110 includes two primary I/O interfaces. The first primary I/O interface is a serial audio port 120, 130 compatible with many popular A/Ds, D/As and telephone codecs. The second primary I/O interface is an ATM interface 140 with architectural support for AAL5 segmentation and reassembly (SAR) processing. Unlike traditional SARs which are either completely implemented in hardware or software, Euphony's ATM interface 140 provides hardware support for time critical functions such as CRC-32 calculations, for example, and leaves non-time critical functions to software. Such an implementation provides excellent performance while utilizing only a small amount of die area.

The EAT 100 includes 4 MB of SRAM 150 and 2 MB of Flash memory 160 coupled to Euphony 100 via a memory and peripheral bus 170 at a memory-and-peripheral-bus interface 180. In other embodiments, DRAM is coupled to Euphony's DRAM controller providing even greater cost savings which may be significant in some consumer devices.

Euphony's signal processing capabilities coupled with its integrated serial port provide an effective platform for packet telephony audio processing. The EAT 100 may provide for a plurality of audio I/O interfaces such as a telephone handset with a handset microphone 190 and a handset speaker 200, a case mounted with a case microphone 210 and a case speaker 220, and an external microphone/line input 230 and line output 240, for example. The case speaker 220 generates telephone ringing, for example. Thus, the EAT 100 may not only generate tradition telephone ring tones, but also allows the implementation of services such as voice announcement, for example. The case microphone 210 and the case speaker 220 may be used together to implement a speaker phone, for example. The external microphone/line input 230 and line output 240 support two audio channels (i.e., stereo operation) and allow the EAT 100 to connect to external speakers and microphones.

The audio input and output interfaces may be implemented by connecting Euphony's serial port 120, 130 to high quality 18-bit linear A/D and D/A converters 250, 260, for example. Audio data format conversion such as p-law, for example, may be performed via software. Two of Euphony's DMA channels are used to move data between memory and the A/D and D/A converters 250, 260. The sample rate for the A/D and D/A converters 250, 260 may be independently selected to be 44.1 kHz, 32 kHz or 8 kHz, for example.

An embodiment of the packet telephony appliance 100 according to the present invention may be implemented using two circuit boards. The two circuit boards are mounted within a custom built plastic case. A first circuit board is a system logic board that mounts in a base of the custom built plastic case and which includes all of the digital and analog components. A second circuit board is an I/O interface board, that mounts at the top of the custom built plastic case and which includes a keypad 270 with a keypad interface 280, a plurality (e.g., 4) of status LEDs 290 and a microswitch for the off-hook detector. The system logic board and the I/O interface board are connected with each other via a ribbon cable.

The EAT 100 connects to standard 25 Mbps ATM networks 300 via Euphony's ATM interface 140. In addition to an ATM connection, the EAT 100 includes two RS232 serial ports for use as a console port 310 and a debug port 320, for example. In an embodiment according to the present invention, only the console port 310 is available to external connections. A PC-style DB9 connector on the back of the custom built plastic case can be connected to external devices such as a Palm Pilot or an LCD touch display, for example.

Figure 2:
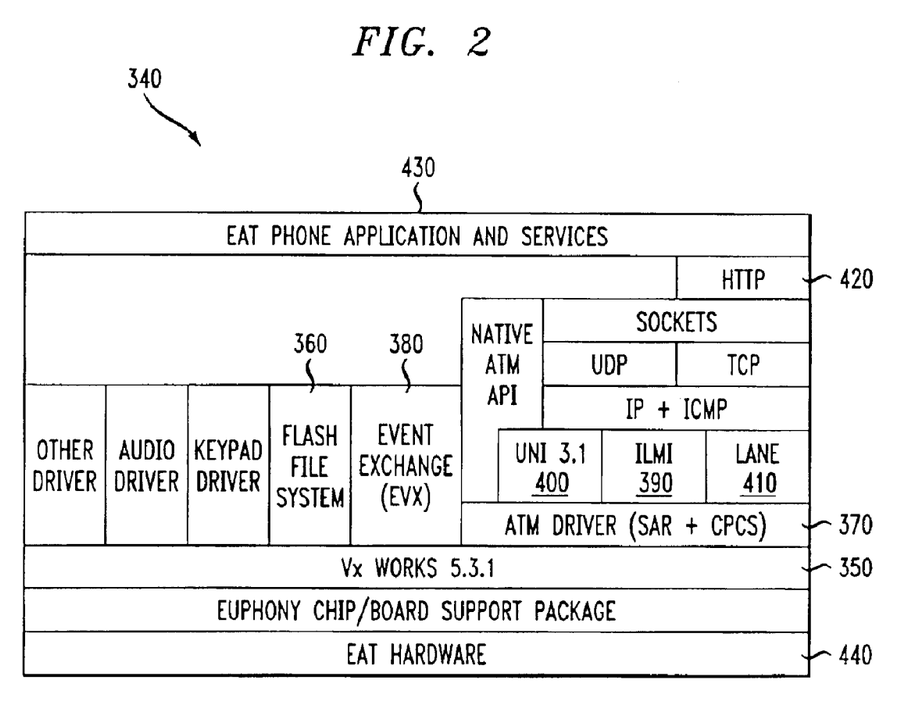
FIG. 2 illustrates a schematic of a system software environment of the packet telephony appliance according to the present invention.

The EAT 100 provides a number of system-level software services. These services include a real-time single address space operating system kernel, a zero-copy I/O buffering mechanism used for communication within EAT, an event-based mechanism for inter-module communication and an IP/ATM networking stack. An example of EAT's system software environment 340 is shown in FIG. 2.

The EAT 100 loads and executes a VxWorks kernel 350 (e.g., VxWorks 5.3.1), for example, on power up. Once booted, the Vxworks kernel can load applications from a network server or from an onboard Flash file system 360. VxWorks has several advantages over standard operating systems (e.g., Linux). For example, the VxWorks kernel 350 has mature support for multithreaded applications in an embedded systems environment while systems such as Linux, for example, are optimized for a timesharing environment. Furthermore, VxWorks supports the real-time scheduling features that telephony applications need. In addition, VxWorks has a smaller memory footprint than traditional systems because general purpose kernel features such as disk-based file systems, virtual memory, multiple address spaces, multiuser support and user account are not of substantial significance in the EAT environment. Moreover, like traditional standard operating systems, VxWorks provides a rich environment that supports dynamic loading of application code and a socket-based TCP/IP networking stack; but unlike traditional standard operating systems which are self hosting, VxWorks provides an excellent set of tools for embedded systems development.

VxWorks has a single address space in which the kernel and application threads execute. The thread scheduler supports both timesharing and preemptive scheduling based on static real-time priorities. Vxworks supports interprocess communication by providing pipes, message queues and semaphores. Threads blocked on a semaphore can queue in priority order. To minimize priority inversion for real-time threads, VxWorks implements priority inheritance for semaphore operations.

To reduce memory usage and to avoid additional latency of data copying, the EAT 100 aggressively implements copy reduction techniques by taking advantage of EAT's single address space architecture. Zero-copying is achieved via IObufs for storing and passing data. IObufs are similar in structure to "mbufs" used in 4BSD Unix systems. Like mbufs, IObufs allow buffer manipulation operations such as, for example, linking to form larger packets without data copying. In addition, application specific information can be stored within IObufs. The ATM driver 370 uses this feature to store DMA state and partial CRC checksum information while transferring data between IObufs and the network 300. The EAT 100 uses IObufs as a uniform buffering mechanism across all modules in the EAT 100 including the application and I/O subsystems. This reduces data and movement costs and enables cross subsystem optimizations as described in V. Pai et al., "IO-Lite: A Unified I/O Buffering and Caching System," Proceedings of the Third Symposium on Operating Systems Design and Implementation, pages 15–28 (February 1999), which is incorporated here by reference in its entirety. IObufs can be used with an event exchange IPC mechanism to obtain benefits such as one to many communication and flow control. Thus, the combination of IObufs with the event exchange IPC mechanism achieves integration of event distribution with data movement.

Because EAT applications include a number of interconnected software modules, the EAT 100 provides an Event Exchange (EVX) inter-module communication mechanism 380. The EVX 380 allows components of the phone to share information in a flexible and efficient manner. The EVX 380 delivers events posted by a module on its "sending port" to one or more interested modules on their EVX "receiving ports".

Features of the EVX 380 include:

Events are named independently of module function names or addresses allowing easy reconfiguration of EVX-based applications. A module can be replaced without modifying other modules.

Events can be delivered to one or more receivers without the event producing module having to explicitly manage its receivers.

Event data is delivered through a zero-copy reference count-based mechanism that reduces the cost of delivering an event to multiple modules. This mechanism can be used with bus to provide a way to exchange bulk data at low cost.

Events are queued at the sending port to provide flow control. This prevents event producers such as a tone generator, for example, from consuming all of the EAT's resources.

The EVX 380 allows EAT-based applications to be separated into two parts: a set of independent modules and a small compositional application that ties modules together. To use the EVX 380, a developer determines which modules are needed for the application and how they interconnect. In one embodiment of the EVX 380 according to the present invention, interconnections are determined when the compositional application is written. Another embodiment of the EVX 380 according to the present invention provides for run-time configuration.

When the compositional application starts, it initializes EVX's global state and creates sending and receiving ports for each module. Each port has a character string name and an associated port data structure. The EVX 380 manages this association so that function names do not have to be hard-wired into modules. Each module commences by initializing its ports before use, setting the queue size of its sending port to provide flow control and to prevent the module from exhausting memory resources. At that point, event producing modules can post events to their sending ports. Posted events are delivered to receiving modules by the EVX 380. Receivers process events and then issue an acknowledgment. The EVX 380 allows threads to block waiting for an event and/or arriving network data.

A feature of the EVX event distribution mechanism 380 is that events are processed at the priority of the receiving head. This feature supports predictable processing for EAT application modules that deal with media streams such as audio, for example. Decoupling the priority of the sender from the priority at which the event is processed naturally lends itself to a multicast IPC model since the same event can be processed at different priorities depending on the receiving thread.

The following illustrates the EVX API:

| EVX Function | Description |
| --- | --- |
| evx_init | Initializes EVX's global state. |
| evx_connect | Establishes a connection between a sending port and a receiving port. Ports are referenced by their string names. Data structures are allocated when the port is referenced in an evx_connect call. |
| evx_initsp | Initializes a sending port. This includes setting the port's queue length. |
| evx_initdp | Initializes a receiving port. |
| evx_post | Post an event to a sending port. This blocks if the port's event queue is full and the non-blocking flag is not set. Optionally, evx_post will wait until the event is delivered, providing synchronous semantics. |
| evx_receive | Receive an event from a sending port. If there is no pending event, then evx_receive returns null. When a receiver finishes processing an event it must call evx_ack to acknowledge it. |
| evx_ack | ________ a receiver's reference to a received event, allowing the sender to recycle the event for future use. Optionally, the sender may request a callback when the event is freed. |
| evx_swalloc | Allocate a new semaphore-wait object. These objects allow a thread to block waiting for events on the associated port(s). An object can be associated with a pipe, allowing a thread to use select to simultaneously wait for an event and I/O. |
| evx_swadd | Add a receive port to a semaphore-wait object. A receive port is associated with only one object at a time. |
| evx_swremove | Remove a receive port from a semaphore-wait object. |
| evx_swwait | Wait for an event to arrive on one of the receive ports added to the specified semaphore wait object. |
| evx_swget | Get a list of receive ports that have pending events from a semaphore-wait object. |
| evx_swpipefd | Return the pipe file descriptor associated with the specified semaphore-wait object so that a client may select on it. The EVX 380 writes a byte to the pipe when a receive port with no queued events receives one. The EVX 380 removes this byte from the pipe when an event is received. |

The main functions used by EVX modules are evx_post to post an event, evx_receive to receive an event, evx_ack to acknowledge a received event, evx_swwait to wait for an event to arrive, and evx_swget to get a list of receive ports with the pending events. The use of semaphore-wait objects allows a decoupling between the specification of events of interest from waiting or events to arrive, thus addressing known scaling problems with a select-like interface.

By using EVX, the EAT 100 provides reduced complexity, easier reconfiguration and extensibility. For example, signaling-specific functions can be encapsulated into a single module. To use a different signaling protocol, a new signaling module is added and module interconnections are adjusted. The present invention also contemplates combining dynamic EVX reconfiguration and dynamically loaded code to provide greater flexibility to EAT application developers.

The EAT 100 supports both IP and native ATM networking. EAT takes advantage of the flexibility and variety of services offered by IP to implement control functions and uses ATM to provide network QoS for voice traffic. EAT networking includes an ATM driver 370 that implements segmentation and reassembly, ATM layers and a TCP/IP stack.

EAT implements segmentation and reassembly with a combination of hardware and software. The hardware performs, for example, cell header checking, DMA with CRC calculation and physical cell transmission and reception. The software initiates DMA transfers for cell transmission and reception. Each AAL5 packet includes one or more IObufs, allowing software to hand off a pointer to an IObuf to initiate a DMA transfer. The software also performs cell pacing.

The EAT provides ILMI 390, UNI 400 and LANE 410 ATM layers as part of the Harris and Jeffries (H&J) Soft ATM package. The ILMI 390 registers EAT's ATM address with the switch while the UNI 400 provides signaling for connection setup and release. The LANE 410 allows an ethernet physical layer to be emulated on an ATM network. When used with an ethernet bridge, the LANE 410 allows the EAT 100 to communicate over both ATM and Ethernet.

The EAT 100 includes a Vxworks TCP/IP stack that provides a complete set of network facilities. This allows, for example, remote file access, remote procedure calls and access to the EAT 100 via telnet. The network facilities also include WindRivers embedded HTTP Server 420. The HTTP server 420 may be used to implement a GUI for advanced services. Using a web browser, for example, a user can place a call, check messages, perform directory lookups or change EAT configurations.

Figure 3:
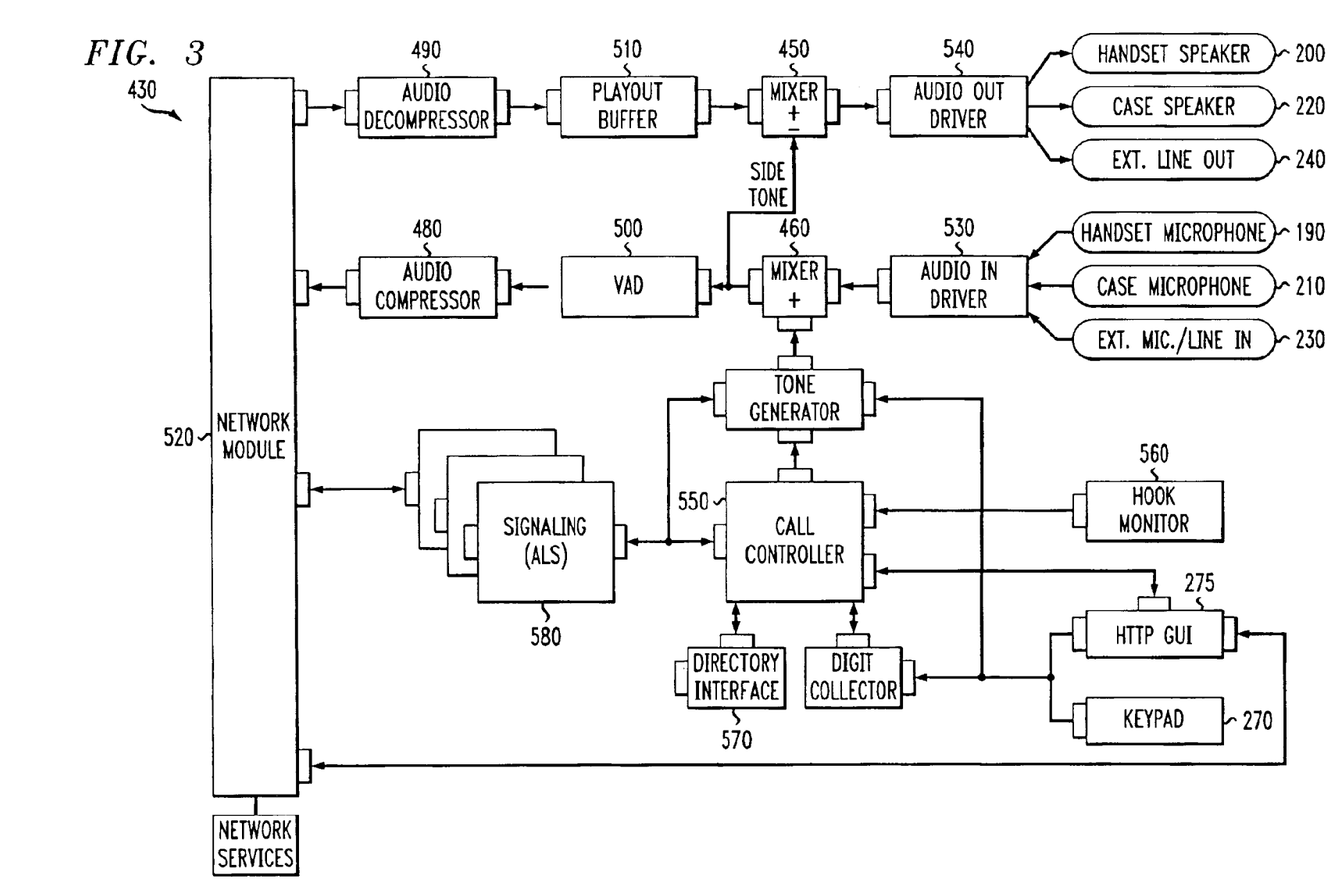
FIG. 3 illustrates components of a packet telephony appliance application and their interconnections using an Event Exchange (EVX) inter-module communication mechanism according to the present invention.

The EAT 100 includes an EAT packet telephone application 430 which is a program that runs on top of EAT's hardware 440 and software services. FIG. 3 illustrates major components of the application and their interconnections using the EVX event communication mechanism 380.

The EAT Packet Telephony Application 430 provides a mixer module 450, 460. The mixer module 450, 460 accepts IObufs containing audio samples posted as EVX events on its two receive ports and produces an EVX event with an IObuf containing the summed digital samples on its send port. The mixer 450, 460 may scale audio samples from its ports prior to summing them. Scaling factors can be set on a per port basis by a controller.

The EAT telephone application may include two mixers 450, 460. The mixer 460 in the audio output path mixes audio samples received from a microphone 190, 210, 230 with audio samples produced by a tone generator 470. This allows, for example, tones resulting from key presses to be heard by the remote endpoint. The mixer 450 in the audio input path sums audio samples received from the network with a scaled version of the locally generated audio samples, and feeds the result into the audio output device 200, 220, 240. The scaled version of the locally generated audio is call the side-tone. Side-tone is auditory feedback that enables the speaker to hear his or her own voice. Without side-tone, for example, it is difficult to determine how loudly to speak and the phone has a dead quality.

Tones are generally used to provide various forms of auditory feedback to the user and as a form of in-band signaling. For example, the busy tone is used to notify the caller that the far end is busy. A combination of tones are used to represent keypad symbols. These tones are often converted back to keypad symbols by a tone detector at the far end in systems such as voicemail, for example. Although a packet network provides separate data and control channels, touch tones are still useful when interworking with legacy systems.

The EAT 100 provides tone generation via software. This is advantageous by keeping costs low by not implementing a special purpose hardware tone generator. Furthermore, the tone generator 470 includes a fixed-point integer-based tone generation module which has low overhead. The tone generator 470 produces tones in response to EVX events posted on its receive port. Tone samples are placed into IObufs and are posted as events on its send port. The EVX flow control mechanism allows the rate at which the tone generator produces IObufs to adapt to the rate at which the D/A drains audio samples.

When the phone application is started, the tone generator module 470 creates a 512-entry table including equally spaced samples of a sine wave which are scaled for full output. To generate a tone of a particular frequency f, the tone generator treats the table as a circular array and samples it every [512 (f/s)] entries, where s is the sampling frequency. Although tones generated are not exact, they are generated with a small enough error to interoperate with legacy telephone systems. Furthermore, a table with 512 entries uses only a small amount of memory (2048 bytes).

Multiple single frequency tones are summed to create most standard telephone tones. For example, pressing key 5 on a conventional telephone produces a tone that is equal to the sum of a 770 Hz tone and a 1336 Hz tone. The table is also utilized by the tone generator in producing more complex tones such as a busy tone or a ringing tone.

Packet telephony audio is typically compressed before being sent out onto the network. There are several conventional standards for audio compression. The EAT 100 uses G.711 ($\mu$-law), since it is simple to implement and has negligible processing overhead (i.e., encoding and decoding only use a table lookup and a few shift and logical operations).

Audio compression is implemented using two modules, an audio compressor 480 and an audio decompressor 490. The audio compressor module 480 accepts IObufs containing 18-bit PCM samples on its receive port. It converts the PCM samples to 8-bit $\mu$-law and stores them in IObufs that are posted as events on its sending port. The audio decompressor module 490 performs the reverse operation.

The present invention also contemplates replacing the audio compressor and the de-compressor modules 480, 490 with modules that implement other standards (e.g., G.728). The present invention also contemplates allowing a call controller to select one of several coding standards negotiated during call setup.

Besides compression, another way to reduce network bandwidth is silence suppression (i.e., when a speaker is silent, voice packets are not transmitted). Detecting silent periods is done by the EAT 100 via a Voice Activity Detector (VAD) 500. The VAD 500 is capable of distinguishing between what parts of an audio signal are voice and what parts of the audio signal are background noise, which can be treated as silence. The VAD 500 computes the power of each discrete sample and compares it with a decision threshold. The decision threshold may be adjusted in response to changes in noise levels. The VAD 500 is advantageous in that it lacks complexity and uses less numeric precision for computing and updating operating parameters.

A playout buffer module 510 receives decompressed audio samples from the network 520 and performs delay jitter removal and loss concealment. Audio packets can experience variable transit delays due to queuing and congestion. The variance in delay is called the jitter. The playout buffer module 510 estimates jitter and delays audio samples appropriately. This introduces additional delay but avoids gaps during audio playback caused by audio packets arriving late. Packet networks can also occasionally lose packets. Although it is impossible to reconstruct audio samples from a missing packet, it is possible to produce transitions that are less distracting than pure silence. Loss concealment mechanisms are available to do this.

An audio input driver 530 delivers audio samples from the D/A in IObufs. The IObufs are passed as EVX events to the mixer 460 in the audio output path. The mixer 460 sums these audio samples with samples from the tone generator 470. The output of the mixer is then sent to the audio input path via the mixer 450 as side-tone and to the VAD module 500. The VAD 500 passes non-silent audio samples to the audio compression module 480 for coding. Once a fixed number of coded samples are available, they are passed to the network interface module where they are encapsulated in a packet and transmitted on the network. A simple encapsulation is employed which is similar to that described in A. Fraser et al., "Encapsulation of Real-Time Data Including RTP Streams over ATM," Included in H.323 Media Transport Over ATM Living List of Issues in the ATM Forum (February 1998) which is incorporated by reference in its entirety. The present invention also contemplates other encapsulations such as RTP, for example, as described in H. Schulzrinne, "RTP: Real-time Transport Protocol," RFC 1889 (January 1996) which is incorporated by reference in its entirety.

The network interface module receives audio packets from the network, decapsulates them, determines if any packets were lost, and passes the audio data in IObufs as EVX events to the audio decompressor module 490. There the audio samples are uncompressed and passed to the playout buffer module 510. The playout buffer module 510 determines the playout time for the audio samples. If packets were lost, the playout buffer module performs loss concealment. When it is time for data in the playout buffer 510 to be processed, an IObuf is sent to the mixer 450 in the audio input path. The mixer 450 combines audio received from the network with a scaled version of the side-tone and passes it to the audio output driver 540. The audio output driver plays the audio on the selected output device (i.e., handset speaker 200, case speaker 220 and/or external speaker 240).

The call controller 550 sets up and manages telephone conversations on the packet telephone. When a user initiates a new call, an EVX event is sent by a user interface component (e.g., a hook monitor 560) to the call controller 550. In response to this, the call controller 550 prompts the user for the DN of the party to be called. Since the DN can be input using any available user interface such as a keypad 270 or a remote web browser 275, for example, EVX events prompt the user and pass the DN to the call controller 550. Thus, different user interfaces may be accommodated.

Once the call controller 550 has obtained the DN, it initiates a directory lookup via a directory interface 570 to map the DN to a set of call appearances. The call controller 550 passes information from a call appearance as an EVX event to a signaling module 580 which uses the event information to establish a call. Unlike most traditional phones, a packet phone may have multiple simultaneous calls in progress at any point in time. The call controller 550 passes user interface events it receives to the currently active call context (i.e., the one in focus).

The EAT 100 provides for a signaling module 580 that implements the application layer signaling (ALS) protocol as described in V. Pai et al., "IO-Lite: A Unified I/O Buffering and Caching System," Proceedings of the Third Symposium on operating Systems Design and Implementation, pages 15–28 (February 1999) which has already been incorporated by reference in its entirety.

For each call, the ALS module 580 maintains a call state machine and makes the appropriate transitions according to network messages and user actions that it receives on EVX ports. It uses EVX events to post call states that are of relevance to other components. For example, when the ALS 580 gets a busy indication from a called party it posts this state as an event on its send port. This causes the tone generator 470 to generate a busy tone if that call is in focus. Using a common EVX event format for posting signaling events allows the ALS 580 to be replaced by different protocols without having to modify other modules in the application. It also allows a single packet telephone application to support multiple signaling protocols on a per call basis.

The ALS 580 allows telephony applications and servers to interact for the purpose of call establishment, management and termination. The common case of point-to-point voice telephony is supported simply and efficiently, while more complicated scenarios such as multimedia and conference calls, for example, may be handled through protocol enhancements.

Protocol features include:

A lightweight protocol with a small set of messages.

Single protocol for all interactions (i.e., between applications, PSTN gateways and conferencing servers).

Allows negotiation of call parameters such as number of media streams and terminal capabilities, for example.

Allows interaction with network protocols to ensure that sufficient resources are available for a call.

Transport-layer independent.

The ALS 580 uses a two-phase message exchange. The first exchange involves inviting the remote terminal to enter into a call and includes call parameters and terminal capabilities. If the remote terminal does not support the requested capabilities, or the remote terminal is busy, a negative acknowledgment is returned. A positive acknowledgment causes media streams to be set-up and network resources to be allocated. If resources are available, a second message exchange is used to alert the called party of an incoming call.

The present invention includes the EAT, a packet telephony appliance. The EAT includes a detailed system architecture, a unified buffering mechanism for space and time efficiency and a related event exchange mechanism that enables extensibility. The EAT packet telephony appliance is based on the Euphony network processor that integrates networking and DSP functions to provide a low cost and efficient solution for building networked appliances. The EAT runs a real-time operating system that allows predictable operation with support for guaranteed processing of voice data. The system services provide for buffering, intra-process communication and networking on which the phone application is built. The EAT provides for at least two mechanisms that conserve memory and provide for a highly efficient, but extensible software system. The first mechanism is IObufs, which is used by all software modules that require data to be exchange. The second mechanism is the Event Exchange. A combination of these two mechanisms provides an efficient scheme for integrated event/data delivery and allows the EAT to easily evolve to accommodate new protocols and services.

Thus, as can be seen from the above, the present invention of the packet telephony appliance includes aggressive integration of hardware functions, the ability to accommodate new protocols and services, and a simple keypad that provides the user with a traditional interface. The packet telephony appliance includes a basic keypad as a default input device, but further supports remote and attached GUIs. The packet telephony appliance has low memory requirements via, for example, a small real-time operating system and the implementation of zero-copy techniques. New protocols and services may be achieved via software control, for example. The present invention provides an event communication mechanism that easily integrates new software modules of the packet telephony appliance and further provides that, for basic telephony, the packet telephony appliance need no user configuration, plug-in components and/or additional audio equipment.

In the foregoing description, the present invention has been described with reference to specific embodiments. It is to be understood and expected that variations in the principles of the methods and the systems herein disclosed may be made by one of ordinary skill in the art and it is intended that such modifications, changes and substitutions are to be included within the scope of the present invention as set forth in the appended claims. The specification and the drawings are accordingly to be regarded in an illustrative, rather than in a restrictive sense.

What is claimed is:

1. A packet telephony appliance, comprising:

network processor that integrates networking and DSP functions, the network processor having a serial input port, a serial output port and a network interface;

an output device coupled to the serial output port;

an input device coupled to the serial input port; and a network coupled to the network interface, wherein the packet telephony appliance implements a unified buffering mechanism that provides zero-copy data movement, and wherein the packet telephony appliance implements an event-based mechanism for intra-appliance communication.

2. The packet telephony appliance according to claim 1, wherein the network processor is a Euphony network processor.

3. The packet telephony appliance according to claim 2, wherein the packet telephony appliance is a Euphony ATM telephone (EAT).

4. The packet telephony appliance according to claim 2, wherein the network is an ATM network, and wherein the network interface is an ATM network interface.

5. The packet telephony appliance according to claim 1, wherein the output device includes at least one of a handset speaker, a case mounted speaker and an external speaker.

6. The packet telephony appliance according to claim 1, wherein the input device includes at least one of a handset microphone, a case mounted microphone and an external microphone.

7. The packet telephony appliance according to claim 1, wherein the packet telephony appliance runs a real-time operating system.

8. The packet telephony appliance according to claim 1, wherein the unified buffering mechanism is IObufs.

9. The packet telephony appliance according to claim 1, wherein the event-based mechanism for intra-appliance communication is an Event Exchange inter-module communication mechanism.

10. The packet telephony appliance according to claim 1, wherein the unified buffering mechanism and the event-based mechanism provide a scheme for integrated event/data delivery that accommodates new protocols and services.

11. The packet telephony appliance according to claim 1, further comprising:

RAM, Flash memory and a keypad coupled to the network processor via a memory and peripheral bus.

12. The packet telephony appliance according to claim 11, further comprising:

a plurality of RS232 serial ports coupled to the network processor via the memory and peripheral bus.

13. A method for providing system software services in a packet telephony appliance, comprising the steps of;

loading and executing a real-time single address space operating system kernel;

implementing a uniform buffering mechanism across all modules in the packet telephony appliance, the uniform buffering mechanism being a zero-copy mechanism for storing and passing data; and implementing an event-based mechanism for communicating between the modules.

14. The method according to claim 13, wherein the step of load and executing includes the step of loading and executing a VxWorks kernel.

15. The method according to claim 13, wherein the step of implementing the uniform buffering mechanism includes the step of implementing IObufs.

16. The method according to claim 13, wherein the step of implementing the event-based mechanism includes the step of implementing an Event Exchange inter-module communication mechanism.

17. The method according to claim 13, wherein the step of implementing the event-based mechanism includes the steps of creating a sending port and a receiving port for each module, initializing the sending ports and the receiving ports before use, setting a queue size of the sending ports to control flow, posting events to the sending port of a sending module, and delivering posted events to the receiving port of a receiving module.

18. The method according to claim 17, wherein the step of implementing the event-based mechanism further includes the steps of processing delivered events and issuing an acknowledgment.

19. The method according to claim 13, wherein the step of implementing the event-based mechanism includes the step of processing events at a priority of a receiving thread.

20. The method according to claim 13, wherein the step of implementing the event-based mechanism includes decoupling a priority of a sender from a priority at which an event is processed.

21. A method for providing a packet telephony appliance, comprising the steps of:

integrating networking and DSP functions into a network processor;

implementing a uniform buffering mechanism across all modules in the packet telephony appliance, the uniform buffering mechanism being a zero-copy mechanism for storing and passing data; and implementing an event-based mechanism for communicating between the modules.

* * * * *